(12) United States Patent
Kobayashi

(10) Patent No.: US 8,300,315 B2
(45) Date of Patent: Oct. 30, 2012

(54) HEAD-MOUNTED DISPLAY

(75) Inventor: Hidekazu Kobayashi, Suwa-gun (JP)

(73) Assignee: Seiko Epson Corporation, Tokyo (JP)

( * ) Notice: Subject to any disclaimer, the term of this patent is extended or adjusted under 35 U.S.C. 154(b) by 130 days.

(21) Appl. No.: 12/949,932

(22) Filed: Nov. 19, 2010

(65) Prior Publication Data
US 2011/0122500 A1 May 26, 2011

(30) Foreign Application Priority Data
Nov. 26, 2009 (JP) ................................. 2009-268445

(51) Int. Cl.
*G02B 27/14* (2006.01)
*G03H 1/00* (2006.01)
*H04N 7/00* (2011.01)

(52) U.S. Cl. ........................ 359/630; 359/13; 348/115

(58) Field of Classification Search .................. 359/13, 359/630; 348/115
See application file for complete search history.

(56) References Cited

U.S. PATENT DOCUMENTS
6,417,820 B1 * 7/2002 Choi ................................. 345/8

FOREIGN PATENT DOCUMENTS

| JP | A-2000-58260 | 2/2000 |
| JP | A-2000-333211 | 11/2000 |
| JP | A-2001-332392 | 11/2001 |
| JP | A-2002-252089 | 9/2002 |

* cited by examiner

*Primary Examiner* — William Choi
(74) *Attorney, Agent, or Firm* — Oliff & Berridge, PLC

(57) ABSTRACT

A head-mounted display includes: a double-sided display device displayed a image on a first side and a second side opposed the first side; a first optical system that forms the image displayed on the first side of the double-sided display device on one eye of a wearer; and a second optical system that forms the image displayed on the second side of the double-sided display device on the other eye of the wearer. The first optical system and the second optical system have switching mechanisms which make at least a part of view being different from the image displayed on the double-sided display devise visible in eyes of the wearer.

9 Claims, 8 Drawing Sheets

FIG. 3A

| 41 | 42 | 41 | 42 | 41 | 42 | 41 | 42 |
| 41 | 42 | 41 | 42 | 41 | 42 | 41 | 42 |
| 41 | 42 | 41 | 42 | 41 | 42 | 41 | 42 |
| 41 | 42 | 41 | 42 | 41 | 42 | 41 | 42 |
| 41 | 42 | 41 | 42 | 41 | 42 | 41 | 42 |

| 41 | 42 | 41 | 42 | 41 | 42 | 41 | 42 |
| 42 | 41 | 42 | 41 | 42 | 41 | 42 | 41 |
| 41 | 42 | 41 | 42 | 41 | 42 | 41 | 42 |
| 42 | 41 | 42 | 41 | 42 | 41 | 42 | 41 |
| 41 | 42 | 41 | 42 | 41 | 42 | 41 | 42 |

100

HEAD-MOUNTED DISPLAY

BACKGROUND

1. Technical Field

The present invention relates to a head-mounted display.

2. Related Art

The head-mounted display is a display worn on a head, and is used in realization of virtual reality and the like. As a configuration of the head-mounted display, there is a general form, which is shown in JP-A-2000-333211, using two display devices corresponding to both eyes of a user.

As it is, two display devices are necessary for the head-mounted display having such a configuration, and thus the manufacturing cost thereof increases. Further, since the display devices are disposed to face the user's eyes, it is difficult to use the display in the way of performing a display so as to switch into an outer image (a view) or superimpose an image of the display device upon the outer image.

SUMMARY

The invention can be embodied in the following forms or applications.

Application 1

According to an application, a head-mounted display includes: a double-sided display device displayed a image on a first side and a second side opposed the first side; a first optical system that forms the image displayed on the first side of the double-sided display device on one eye of a wearer; and a second optical system that forms the image displayed on the second side of the double-sided display device on the other eye of the wearer. The first optical system and the second optical system have switching mechanisms which make at least a part of view being different from the image displayed on the double-sided display devise visible in eyes of the wearer.

With such a configuration, the display devices are not disposed to face the eyes, and it is possible to form images of the corresponding display devices (on both eyes of a user). Accordingly, it is possible to embody a head-mounted display capable of making a view of the outside (a video) visible simply by switching the optical systems without moving the display device.

Application 2

In the above-mentioned head-mounted display, it is preferable that the first optical system includes a first mirror reflected at least a part of the image displayed on the first side of the double-sided display device and a first convex lenses disposed between the double-sided display device and the first mirror, and the second optical system includes a second mirror reflected at least a part of the image displayed on the second side of the double-sided display device and second convex lenses disposed between the double-sided display device and the second mirror. The first mirror and the second mirror each have the switching mechanisms.

With such a configuration, by moving the mirrors, it is possible to switch the above-mentioned pair of optical systems. Accordingly, it is possible to simplify the configuration thereof, and thus it is also possible to embody a lightweight and low-cost head-mounted display.

Application 3

In the above-mentioned head-mounted display, it is preferable that the first mirror includes a first half mirror having semi-transparency/reflectivity and a first total reflection mirror having total reflectivity, the first half mirror and the first total reflection mirror being able to move independently of each other, and the second mirror includes a second half mirror having semi-transparency/reflectivity and a second total reflection mirror having total reflectivity, the second half mirror and the second total reflection mirror being able to move independently of each other.

With such a configuration, by moving the total reflection mirror, it is possible to form external light while forming a part of the images of the double-sided display device only through the half mirror. Accordingly, it is possible to embody a head-mounted display capable of simultaneously displaying (imaging) both the view of the outside (video) and the images of the display device in a superimposed manner.

Application 4

In the above-mentioned head-mounted display, it is preferable that the double-sided display device should be a double-sided display device formed by combining two display devices so that surfaces on which the images are not displayed face each other.

With such a configuration, by using the display devices according to the related art, it is possible to embody a head-mounted display capable of simultaneously displaying both the view of the outside and the images of the display devices in a superimposed manner.

Application 5

In the above-mentioned head-mounted display, it is preferable that the double-sided display device has a pair of substrates of a first substrate including the first surface and a second substrate including the second surface and a light emitting function layer including at least an organic EL layer which is disposed between the first substrate and the second substrate, in which second pixels for emitting light toward the first substrate and first pixels for emitting light toward the second substrate are arranged. It is also preferable that each first pixel has a pixel electrode which is formed on a side of the light emitting function layer close to the first substrate, a common electrode that is formed on a side of the light emitting function layer close to the second substrate, and a reflection layer which is formed on the side of the light emitting function layer close to the first substrate. It is also preferable that each second pixel should have a pixel electrode which is formed on the side of the light emitting function layer close to the first substrate, a common electrode that is formed on the side of the light emitting function layer close to the second substrate, and a reflection layer which is formed on the side of the light emitting function layer close to the second substrate. It is also preferable that, in the double-sided display device, driving elements for driving each pixel electrode should be formed on the side of the light emitting function layer close to the first substrate.

With such a configuration, it is possible to embody the double-sided display device by using the single light emitting function layer. Thus, it is possible to embody a head-mounted display capable of simultaneously displaying both the view of the outside and the images of the double-sided display devices in a superimposed manner at a low cost.

Application 6

In the above-mentioned head-mounted display, it is preferable that the double-sided display device should be configured so that each first pixel has three types of sub-pixels of a first red sub-pixel for emitting red light, a first green sub-pixel for emitting green light, and a first blue sub-pixel for emitting blue light, and each second pixel has three types of sub-pixels of a second red sub-pixel for emitting red light, a second green sub-pixel for emitting green light, and a second blue sub-pixel for emitting blue light.

With such a configuration, it is possible to embody a head-mounted display capable of colorizing the images of the double-sided display device in accordance with the above-mentioned view of the outside.

Application 7

In the above-mentioned head-mounted display, it is preferable that each sub-pixel should have a color filter corresponding to an emission color of the corresponding sub-pixel on a side of the light emitting function layer opposite to the reflection layer.

With such a configuration, it is possible to emit light with a different color for each sub-pixel by using the light emitting function layer which emits common white light in the above-mentioned sub-pixels. Accordingly, it is possible to embody a head-mounted display capable of colorizing the images of the double-sided display device at a low cost.

Application 8

In the above-mentioned head-mounted display, it is preferable that each sub-pixel should have a semi-transreflective layer on the side of the light emitting function layer opposite to the reflection layer. In addition, it is also preferable that an optical resonator structure for resonating light in a specific wavelength range should be formed between the semi-transreflective layer and the reflection layer.

With such a configuration, it is possible to emit light with a different color for each sub-pixel by using the light emitting function layer which emits common white light in the above-mentioned sub-pixels. Accordingly, it is possible to embody a head-mounted display capable of colorizing the images of the double-sided display device at a low cost.

Application 9

In the above-mentioned head-mounted display, it is preferable that the organic EL layer included in the light emitting function layer should be individually formed in accordance with the emission color of the corresponding sub-pixel for each sub-pixel.

With such a configuration, it is possible to emit light with a different color for each sub-pixel without using the resonator structure and the color filters. Accordingly, it is possible to embody a head-mounted display capable of colorizing the images of the double-sided display device at a low cost. The term "individually formed in accordance with the emission color" has the following meaning: in the red sub-pixel, the organic EL layer is formed for emitting light high in a wavelength range corresponding to the red light; in the green sub-pixel, the organic EL layer is formed for emitting light high in a wavelength range corresponding to the green light; and in the blue sub-pixel, the organic EL layer is formed for emitting light high in a wavelength range corresponding to the blue light.

BRIEF DESCRIPTION OF THE DRAWINGS

The invention will be described with reference to the accompanying drawings, wherein like numbers reference like elements.

FIGS. 3A and 3B are diagrams illustrating an arrangement of two kinds of pixel areas within a display area of an organic EL device.

DESCRIPTION OF EXEMPLARY EMBODIMENTS

Figure 1A:
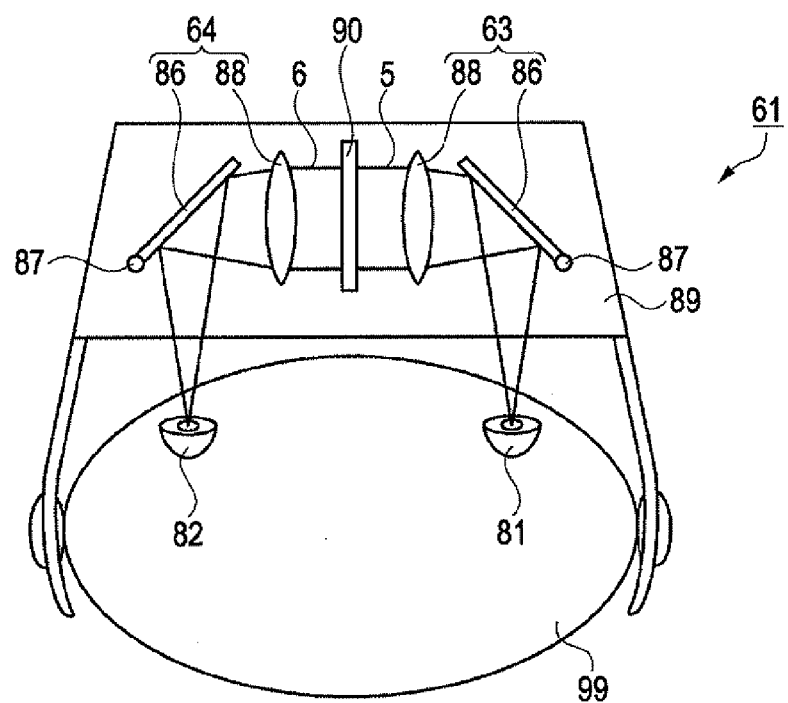
FIGS. 1A and 1B are diagrams schematically illustrating a head-mounted display according to a first embodiment.

Hereinafter, organic EL devices as display devices according to embodiments of the invention will be described with reference to the accompanying drawings. It should be noted that any EL device including an EL device using an inorganic EL material may be used as well in the invention. However, in the embodiments, description will be given of examples of organic EL devices using an organic-based EL material as the EL material. In addition, the purpose of the accompanying drawings is to facilitate the understanding of the respective layers and elements in the drawings. Accordingly, scale ratios of the layers and elements may not exactly reflect those in an actual situation.

First Embodiment

Figure 1B:
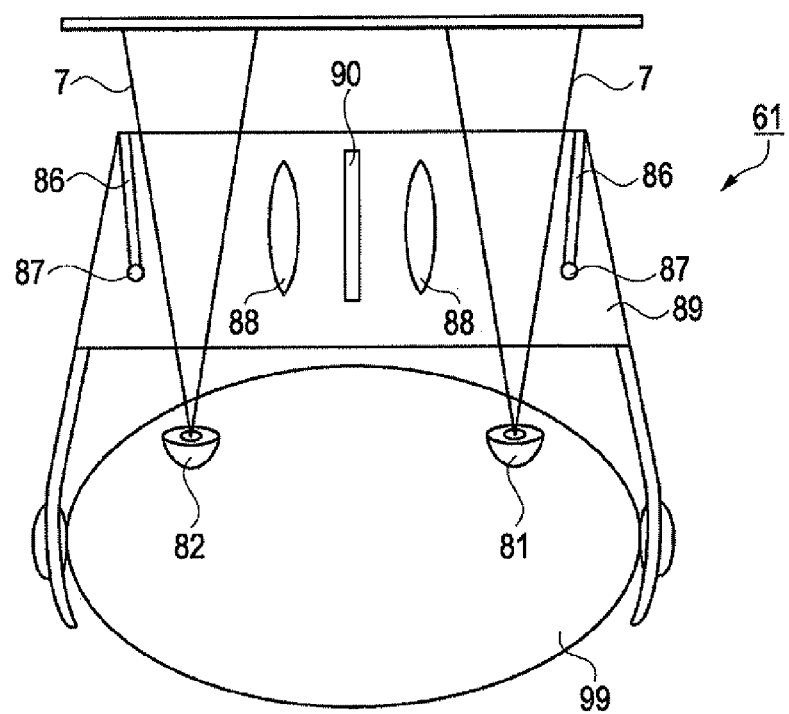

FIGS. 1A and 1B are diagrams schematically illustrating a head-mounted display 61 according to a first embodiment of the invention, and schematically show the corresponding head-mounted display worn on a human head 99 as viewed from above (the upper side of the head).

The head-mounted display 61 includes at least: a casing 89 that can be worn on the human head 99; a double-sided display device 90 that is disposed in the corresponding casing; and a pair of optical systems of a first optical system 63 and a second optical system 64. The first optical system 63 is an optical system that forms an image, which is displayed on one surface of the double-sided display device 90, on the right eye 81. The second optical system 64 is an optical system that forms an image, which is displayed on the other surface of the double-sided display device 90, on the left eye 82. It should be noted that, in the following description, when the term "eyes (81, 82)" is written, it represents "the right eye 81 and the left eye 82". Likewise, when the term "the pair of optical systems (63, 64)" or "each optical system (63, 64)" is written, it represents "the first optical system 63 and the second optical system 64". It is the same for different elements (such as pixel areas) to be described later.

Each optical system (63, 64) includes at least a convex lens 88 and a total reflection mirror 86. The total reflection mirror is defined as a mirror that hardly has optical transparency and mostly reflects emitted light. Accordingly, the head-mounted display 61 according to the embodiment is characterized in that the total reflection mirrors 86 are movable.

The casing 89 is in a state where the front thereof is opened or a transparent member such as glass is disposed at the front, and is configured to make the front side visible unless the pair of optical systems (63, 64) is present. The double-sided display device is a flat type (thin type) display device of which both sides are display surfaces, and is a device capable of forming images on both display surfaces at the same time. The double-sided display device 90 is disposed to be in parallel with the frontal direction of the head 99, that is, to make the display surfaces thereof be perpendicular to the line which connects the right eye 81 and the left eye 82. The term "perpendicular" described herein is defined to include the meaning that the field of view from the eyes of a wearer thereof is not blocked. Accordingly, the corresponding double-sided display device itself hardly blocks the line of sight, that is, the field of view of a person.

Each total reflection mirror 86 has a shaft 87 provided at one end thereof, and is rotatable about the corresponding shaft as the center thereof in a predetermined range. Each shaft 87 in the embodiment extends in a perpendicular direction (that is, the vertical direction) as viewed from the wearer. The extending direction is not particularly limited, and the shaft may extend in any direction if only the total reflection mirror 86 can be rotated in a predetermined angular range so that the forward field of view can be secured.

FIG. 1A shows a situation where each total reflection mirror 86 is at the normal position, that is, a position at which a person wearing the corresponding head-mounted display is in visual contact with the images displayed on the double-sided display device 90. Each convex lens 88 is disposed substantially in parallel with the double-sided display device 90 (the display surfaces thereof). In addition, the total reflection mirror 86 has an angle of approximately 45 degrees with respect to the double-sided display device 90 in plan view from the wearer, and is disposed so that the reflective surface thereof is directed to the head 99.

It is convenient to consider that, in a position of the total reflection mirror 86, one or other of the position shown in FIG. 1A and the position shown in FIG. 1B to be described later may be the normal position, that is, an original position. Since the invention relates to a head-mounted display, in the description of the embodiment, when the images displayed on the double-sided display device 90 are visible, the position of the mirror at that time is referred to as the "normal position" for convenience of description.

The image displayed (formed) on one surface of the double-sided display device 90 is slightly reduced through the convex lens 88 included in the first optical system 63, is then deflected through the total reflection mirror 86 by 90 degrees, and is formed in the right eye 81. The image displayed (formed) on the other surface, that is, the opposite surface thereof is slightly reduced through the convex lens 88 included in the second optical system 64, is then deflected through the total reflection mirror 86 by 90 degrees, and is formed in the left eye 82. Accordingly, the double-sided display device 90 is disposed in parallel with the line of sight. Nevertheless, a person who is equipped with the corresponding head-mounted display (hereinafter referred to as a "wearer") is able to view the images displayed by the double-sided display device in the front direction.

FIG. 1B shows a situation where the images displayed on the double-sided display device 90 are made to be invisible and a view of the outside (a video) is made to be visible by moving the total reflection mirrors 86 included in each optical system (63, 64). As described above, each total reflection mirror 86 has the shaft 87, which extends in a direction of the gravitational force, provided at one end thereof, and is rotatable about the corresponding shaft as the center thereof in a predetermined range. Accordingly, as shown in the drawing, each total reflection mirror 86 can be moved about the shaft 87 as the center of the movement so as to be substantially in parallel with each convex lens 88. By moving the mirrors in such a manner, similarly to the form of the arrangement of the double-sided display device 90 and the convex lenses 88, the total reflection mirrors 86 are disposed to have almost no influence on the line of sight, that is, the field of view of a person. As a result, the wearer is able to see the front view (the video) with the corresponding head-mounted display worn.

Advantages of the Embodiment

As described above, the head-mounted display 61 according to the embodiment is characterized in that the images displayed on the display device (the double-sided display device 90) built therein and the view of the outside (the video) are switchable and the images thereof are formed in the wearer's eyes (81, 82). Even in a general head-mounted display, that is, a head-mounted display in which the display device is disposed on a surface perpendicular to the line of sight, such an advantage can be achieved by allowing a wearer to put on and take off the head-mounted display itself. However, it takes a considerable amount of time to put on and take off the head-mounted display, and thus it is difficult to switch the images using a simple method. In contrast, in the head-mounted display 61 according to the embodiment, the images of the display device are reflected through the total reflection mirrors 86, and are formed in the eyes (81, 82). Hence, the wearer is able to perform the above-mentioned switching only by moving the corresponding total reflection mirrors. Accordingly, the embodiment is suitable for use when frequently switching and viewing two images (and a view) as described above.

Second Embodiment

Next, a second embodiment of the invention will be described. The head-mounted display 62 according to the second embodiment has a purpose and a form which are common to the above-mentioned head-mounted display 61 according to the first embodiment, and thus their configurations are similar to each other. Accordingly, in the following description, if there are elements common to the above-mentioned head-mounted display 61, the elements are referenced by the same reference numerals and signs, and description thereof will be partially omitted.

Figure 2A:
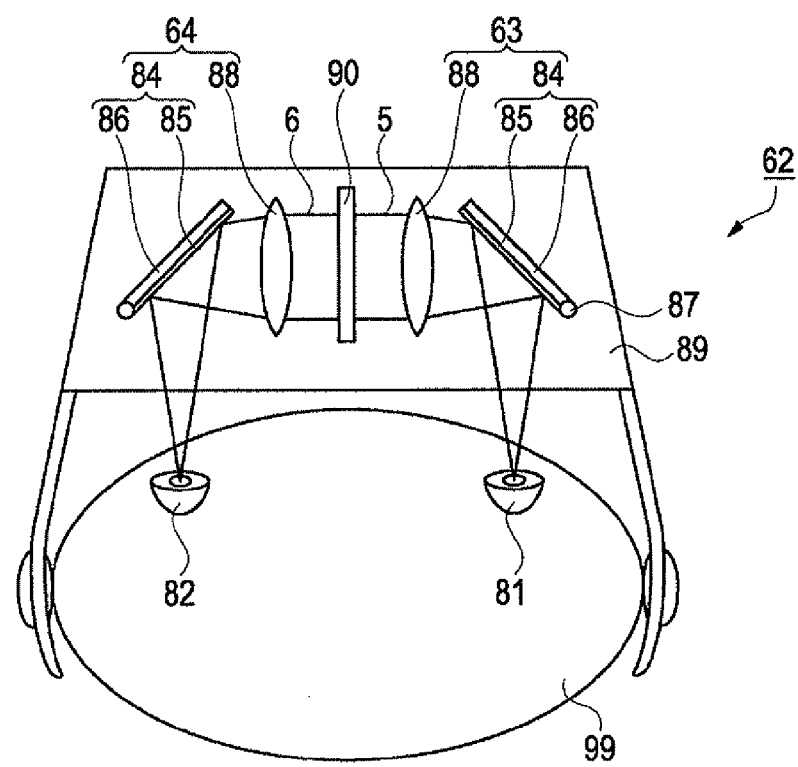
FIGS. 2A and 2B are diagrams schematically illustrating a head-mounted display according to a second embodiment.
Figure 2B:
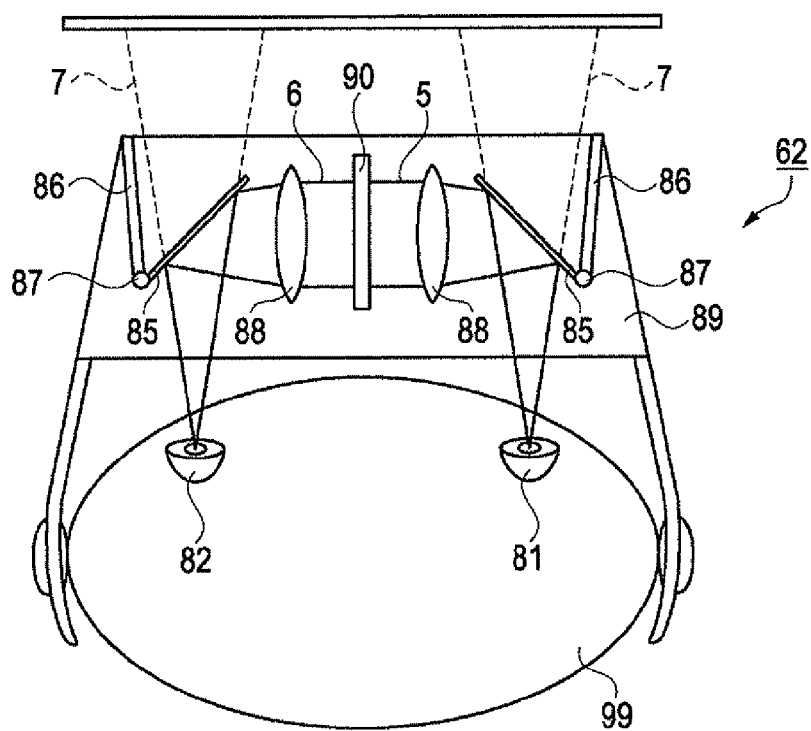

FIGS. 2A and 2B are diagrams schematically illustrating a head-mounted display 62 according to the second embodiment. Similarly to FIGS. 1A and 1B, FIGS. 2A and 2B schematically show the corresponding head-mounted display worn on the wearer's head 99 as viewed from above.

The head-mounted display 62 according to the embodiment is characterized in that the mirrors used in the pair of optical systems (63, 64) are stacked mirrors 84 which are formed by stacking half mirrors 85 on reflective surface sides of the total reflection mirrors 86. Accordingly, each of the pair of optical systems (63, 64) included in the head-mounted display 62 includes at least the convex lens 88, the total reflection mirror 86, and the half mirror 85. The convex lens 88 is the same as that in the above-mentioned first embodiment, and is disposed substantially in parallel with the double-sided display device 90.

In each stacked mirror 84, the half mirror 85 and the total reflection mirror 86 are independently movable. That is, since the stacked mirror 84 has the shaft 87, both the half mirror 85 and the total reflection mirror 86 are independently rotatable about the corresponding shaft as the center thereof in a predetermined angular range.

FIG. 2A shows a situation where the stacked mirror 84 is at the above-mentioned "normal position". That is, both the half mirrors 85 and the total reflection mirrors 86 constituting the stacked mirrors 84 included in the pair of optical systems (63, 64) have an angle of approximately 45 degrees with respect to the double-sided display device 90 in plan view, and are disposed so that the reflective surfaces of the half mirrors 85 are directed to the "eyes (81, 82)".

The image formed on the display surface of the double-sided display device 90, that is, the light emitted from the corresponding display surface toward the stacked mirror 84 is reflected by approximately 50% through the half mirror 85 (after the image is slightly reduced through the convex lens 88), and is formed in either of the eyes (81, 82) of the wearer. Then, the approximately 50% of the above-mentioned remaining light is reflected through the total reflection mirror 86 as well, and is formed in either of the eyes (81, 82). Accordingly, when both mirrors (the half mirror 85 and the total reflection mirror 86) constituting each stacked mirror 84 are at the above-mentioned position of the angle of approximately 45 degrees, only the images formed on the display surfaces of the double-sided display device 90 are formed in the wearer's eyes (81, 82). Consequently, the wearer views only the images formed by the double-sided display device 90.

FIG. 2B is a diagram illustrating a situation where each half mirror 85 remains stationary and only each total reflection mirror 86 is rotated up to the position at which it is substantially in parallel with the double-sided display device 90 from the situation shown in FIG. 2A. In this case, the position of the total reflection mirror 86 is the same as the position thereof in FIG. 1B in the above-mentioned first embodiment. Accordingly, the total reflection mirrors 86 do not perform a function of forming images, which are formed on the display surfaces of the double-sided display device 90, in the wearer's eyes (81, 82). In addition, the wearer's line of sight (the forward field of view) is hardly blocked. Accordingly, only the half mirrors 85 perform the function to form images, which are formed on the display surfaces of the double-sided display device 90, in the wearer's eyes (81, 82).

Here, each half mirror 85 has a function of reflecting approximately 50% of the emitted light and transmitting the remaining approximately 50% thereof. Accordingly, approximately 50% of the light emitted from the double-sided display device 90 is imaged in the eyes (81, 82). In addition, external light 7, that is, light, which is naturally visible for the wearer when the pair of optical systems (63, 64) is absent, is transmitted by approximately 50% through the half mirrors 85, and is imaged in the wearer's eyes (81, 82). Accordingly, the wearer is able to view approximately 50% of the images displayed (formed) by the double-sided display device 90 and approximately 50% of the front view (the video). Consequently, it is possible to view both images (the view) described above in a superimposed manner.

In both cases of the situations shown in FIGS. 2A and 2B, the position of each half mirror 85 is kept at the angle of 45 degrees described above. However, the half mirror 85 may be moved to the position of the total reflection mirror 86 shown in FIG. 2B. When the half mirror 85 and the total reflection mirror 86 are rotated up to the position at which the mirrors are substantially in parallel with the double-sided display device 90, the images of the double-sided display device 90 do not form in the wearer's eyes (81, 82) at all. As a result, the wearer is made to view only the front view with the head-mounted display 62 worn.

Advantages of the Embodiment

As described above, the head-mounted display 62 according to the embodiment is characterized in that both of the images displayed on the display device (the double-sided display device 90) built therein and the view of the outside (the video) are simultaneously formed in the wearer's eyes (81, 82). That is, the head-mounted display 61 according to the first embodiment described above makes the images of the double-sided display device 90 and the view of the outside visible by switching them, but the head-mounted display 62 makes both images (the view) visible for the wearer in the superimposed manner.

Such a function is effective and very useful when the images of the double-sided display device 90 are textual information. For example, in a case where the wearer is a medical doctor, it is possible to view a subject (a patient) and information displayed on the double-sided display device 90 at the same time. In some cases, it is necessary for the doctor to perform surgery while checking the information, which can be indicated by characters, such as blood pressure. In such cases, by using the head-mounted display 62 according to the embodiment, it is possible to improve efficiency and safety.

Figure 4A:
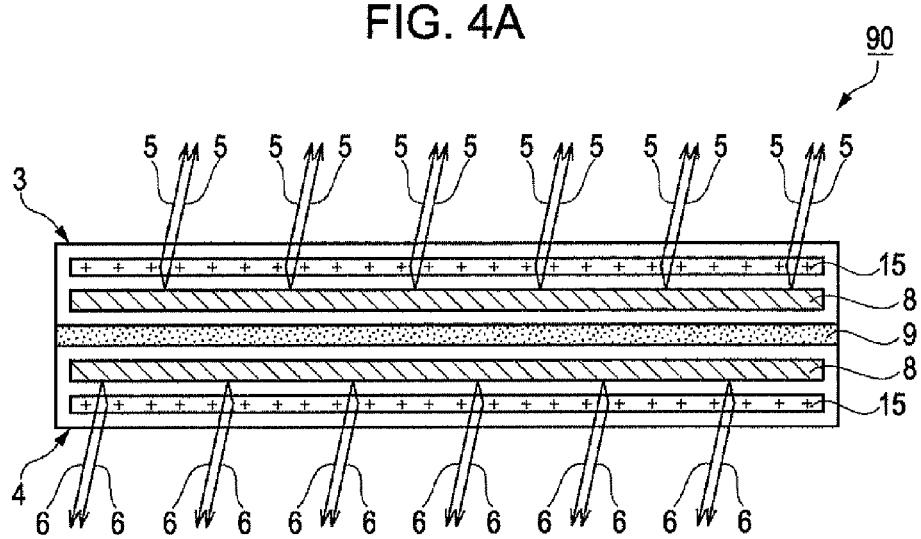
FIGS. 4A and 4B are diagrams illustrating an outline of the double-sided display device.
Figure 4B:
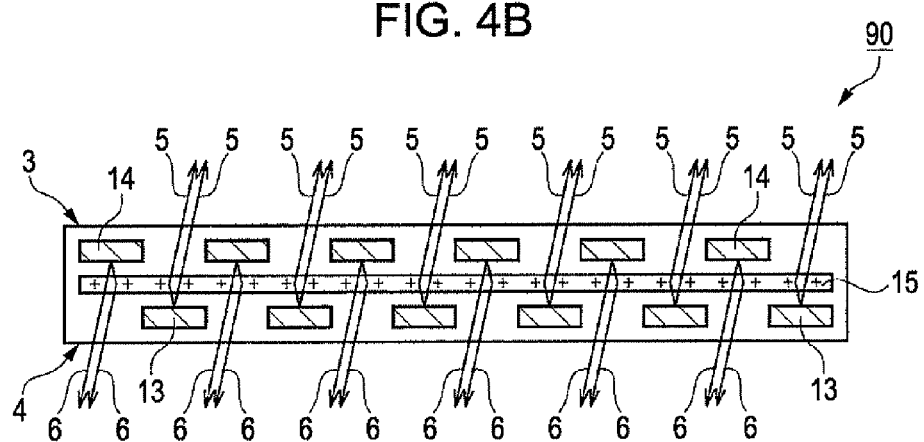

Next, the double-sided display device 90 used in the above-mentioned head-mounted display 61 and the head-mounted display 62 will be described. FIGS. 4A and 4B are diagrams illustrating an outline of the above-mentioned double-sided display device 90. The above-mentioned two head-mounted displays (61, 62) employ EL display devices as the double-sided display devices 90.

The EL display device is a display device using an EL (electroluminescence) phenomenon in which light is emitted by applying a current, and has a configuration in which the light emitting function layer including an EL material layer is sandwiched between a pair of electrodes. The EL material layer is made to emit light by applying a current between the above-mentioned electrodes, and an image can be formed by emitting the light from the display surface. The EL display device used in the above-mentioned head-mounted display (61, 62) is an organic EL display device (hereinafter referred to as an "organic EL device") using an organic-based EL material (an organic EL material) as the EL material.

Here, the organic EL material layer (hereinafter referred to as an "organic EL layer") included in the organic EL device emits light in all directions by applying a current. Hence, when the above-mentioned pair of electrodes is made of a transparent conductive material, a double-sided display device can be formed. However, if the double-sided display device with such a configuration is applied to the optical systems of the above-mentioned head-mounted displays (61, 62), that is, the optical systems shown in FIGS. 1A, 1B, 2A, and 2B, the image is reversed left-to-right, and thus it is difficult to display a normal image. Accordingly, it is necessary for the double-sided display device 90 used in the above-mentioned head-mounted display (61, 62) to respectively display different images on the front and back surfaces of the corresponding double-sided display device.

The double-sided display device 90 can be embodied by bonding two organic EL devices. FIG. 4A is a diagram illustrating the double-sided display device 90 that can be formed by bonding two organic EL devices. The double-sided display device 90 shown in the drawing is configured by bonding the two organic EL devices, each of which has a light emitting function layer 15, through an adhesive layer 9. Both of the above-mentioned two organic EL devices have reflection layers 8 interposed between the light emitting function layer 15 and the adhesive layer 9. As described above, the light of the organic EL layer is emitted in all directions, and thus the emission direction is restricted by the corresponding reflection layer. With such a configuration, it is possible to emit first display light 5, which forms a first image, from an upper surface 3 as one surface of the double-sided display device 90. In addition, it is possible to emit second display light 6, which forms a second image, from a lower surface 4 as the other surface thereof.

However, in the above-mentioned bonded-type double-sided display device 90, it is necessary to form two light emitting function layers, and thus the manufacturing cost increases. Further, the thicknesses of the adhesive layer 9 and a glass substrate to be described later, and the like tend to deteriorate in compactness. For this reason, the above-mentioned head-mounted display (61, 62) employs an organic EL device as the double-sided display device. The organic EL device as the double-sided display device is capable of displaying (forming) images on both the upper surface 3 and the lower surface 4 by using the single light emitting function layer.

FIG. 4B is a diagram illustrating an outline of the double-sided display device (the organic EL device) 90 having such a configuration. As shown in the drawing, the corresponding double-sided display device 90 includes two reflection layers of a first reflection layer 13 and a second reflection layer 14. The reflection layers are disposed to sandwich the single light emitting function layer 15 and to have areas not overlapping each other in plan view.

In the double-sided display device 90 shown in the drawing, in the area in which the first reflection layer 13 is formed and the second reflection layer 14 is not formed in plan view, light generated in the light emitting function layer 15 is directly emitted or is reflected by the first reflection layer 13 and emitted as the first display light 5 from the upper surface 3. In addition, in the area in which the second reflection layer 14 is formed and the first reflection layer 13 is not formed, the light generated in the light emitting function layer 15 is directly emitted or is reflected by the second reflection layer 14 and emitted as the second display light 6 from the lower surface 4. Since different light (display light) is emitted from each of the upper surface 3 and the lower surface 4, an independent image is formed on each corresponding surface. Hence, although the same (single) light emitting function layer is used, it is possible to display (form) images, which are not reversed left-to-right, on either of the above-mentioned surfaces. In addition, the above-mentioned head-mounted displays (61, 62) are configured to make the entirety thereof lightweight and compact by employing the double-sided display device 90 with such a configuration.

Third Embodiment

Hereinafter, the description will be given of the organic EL device with such a configuration as third and subsequent embodiments, that is, the organic EL device capable of the double-sided display by using the single light emitting function layer. It should be noted that, in the following description, when the "organic EL device" is used alone, it represents the generic term of the respective organic EL devices as double-sided display devices 90 according to the third and subsequent embodiments. That is, the term is defined to include an organic EL device 93 according to the third embodiment, an organic EL device 94 according to the fourth embodiment, and an organic EL device 95 according to the fifth embodiment.

FIGS. 3A and 3B are diagrams illustrating an arrangement of two kinds of pixel areas classified by directions of emitting the above-mentioned light (the light emission) in a display area 100 of the organic EL device. As shown in the drawing, in the display area 100, there are regularly arranged two types of pixel areas of first pixel areas 41 as areas in which light is emitted through the upper surface 3 and second pixel areas 42 as areas in which light is emitted through the lower surface 4. The corresponding two types of areas are substantially the same in size.

Here, the "display area" is defined as an area on which an image is displayed (formed). The organic EL device has the display area 100 and a peripheral area surrounding the corresponding display area in plan view. In addition, the "pixel area" is defined as a minimum area capable of emitting arbitrary light. Further, the "pixel area" is based on a planar concept, contrary to the pixel and the sub-pixel to be described later.

Each pixel area (41, 42) has three types of sub-pixel areas in the corresponding pixel area. The three types of sub-pixel areas are a red sub-pixel area (not indicated by a reference numeral) that emits red light, a green sub-pixel area (not indicated by a reference numeral) that emits green light, and a blue sub-pixel area (not indicated by a reference numeral) that emits blue light. By emitting the light of three primary colors with an arbitrary intensity, it is possible to emit arbitrary light, that is, light of which luminosity, chroma, and chromaticity are arbitrarily set. The organic EL device is able to form color images on the respective display areas 100 of the upper surface 3 and the lower surface 4 by emitting the corresponding arbitrary light for each pixel area (41, 42).

FIG. 3A shows a configuration in which the above-mentioned two types of pixel areas (41, 42) are arranged in columns. The arrangement of the pixel areas (41, 42) with such a configuration is advantageous in that it becomes easy to form the second reflection layer 14 (refer to FIG. 5) to be described later. In the drawing, the respective areas are arranged in vertical columns, but may be arranged in horizontal rows. FIG. 3B shows a configuration in which the pixel areas (41, 42) are arranged in a staggered manner. Due to this arrangement, it is possible to display a relatively smooth image. The organic EL device may employ either the above-mentioned column arrangement or a staggered arrangement.

Figure 5:
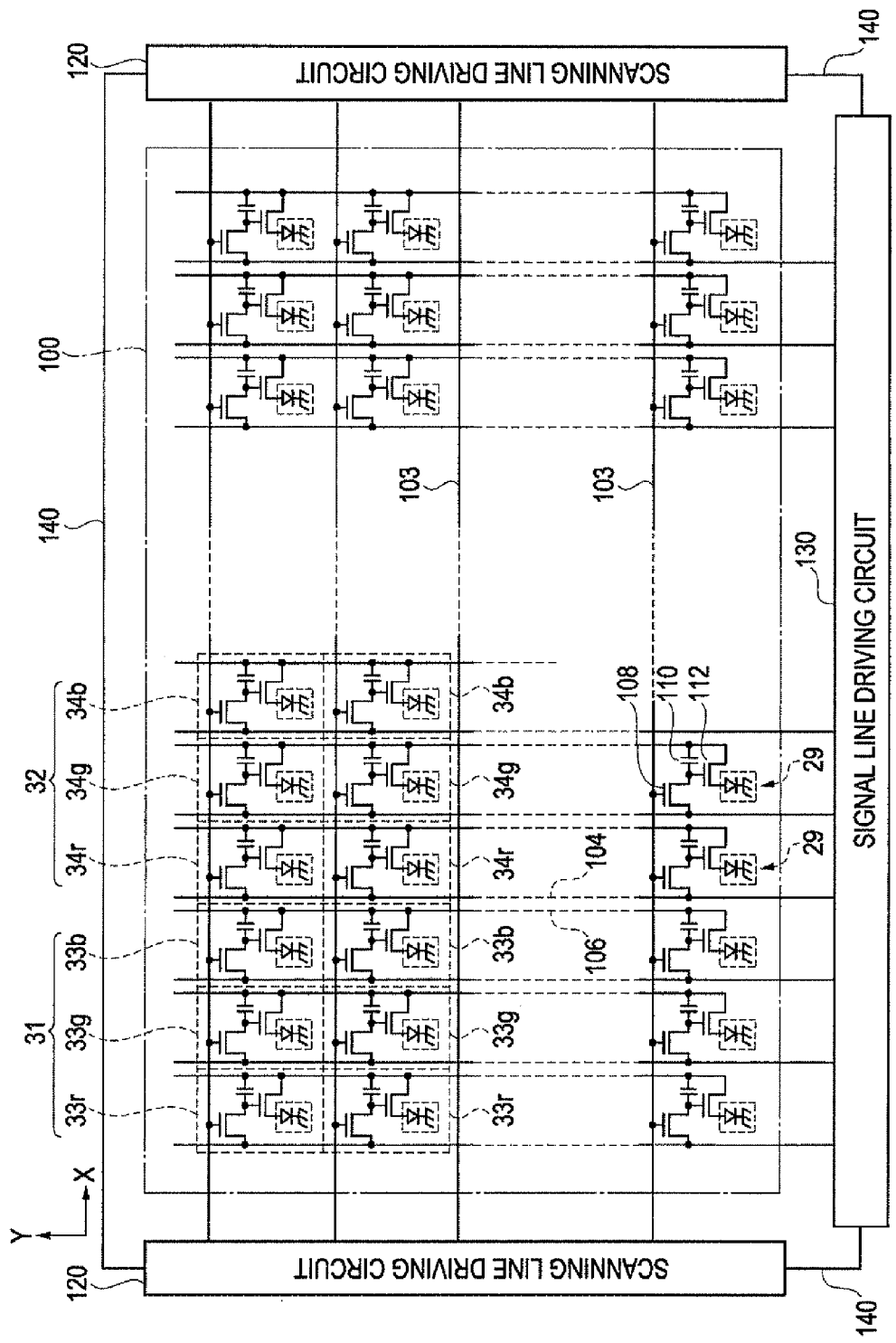
FIG. 5 is a configuration diagram illustrating a circuit of the organic EL device according to a third embodiment.

FIG. 5 is a diagram illustrating a circuit configuration of the organic EL device. The organic EL device has the display area 100 and the peripheral area (not indicated by a reference numeral) which is formed around the display area. In the peripheral area, scanning line driving circuits 120 and a signal line driving circuit 130 are formed. The scanning line driving circuits 120 sequentially supply the scanning signals to scanning lines 103 in response to various signals supplied from an external circuit not shown in the drawing. The signal line driving circuit 130 supplies image signals to signal lines 104. Power lines 106 are supplied with pixel driving current from the external circuit not shown in the drawing. The operations of the scanning line driving circuits 120 and the operations of the signal line driving circuit 130 are synchronized to each other by synchronization signals which are supplied from the external circuit through synchronization signal lines 140.

The display area 100 is provided with the plurality of scanning lines 103 which extend in the X direction, the plurality of signal lines 104 which extend in the Y direction, and the plurality of power lines 106 which extend in the Y direction as well. The sub-pixels (33, 34) are formed for each partition which is defined by each signal line 104 and each power line 106 in the X direction and is defined by each scanning line 103 in the Y direction.

The sub-pixels (33, 34) are elements corresponding to the sub-pixel areas as described above, and the lower-case alphabet letters attached to the reference numerals indicate colors of the emitted light. As shown in the drawing, each first pixel 31 is formed of three types of sub-pixels of a first red sub-pixel 33r, a first green sub-pixel 33g, and a first blue sub-pixel 33b. In addition, each second pixel 32 is formed of three types of sub-pixels of a second red sub-pixel 34r, a second green sub-pixel 34g, and a second blue sub-pixel 34b. The above-mentioned first pixel area 41 is an area in which light generated by the first pixel 31 is emitted, and the second pixel area 42 is an area in which light generated by the second pixel 32 is emitted.

Each sub-pixel (33, 34) includes: a switching TFT (a thin film transistor) 108 in which a gate electrode 23 (refer to FIG. 6) is supplied with the scanning signal through the scanning line 103; a holding capacitance 110 which holds the image signal supplied from the signal line 104 through the switching TFT 108; a driving TFT 112 in which the gate electrode 23 is supplied with the pixel signal held by the holding capacitance 110; an organic EL element 29 to which the driving current is applied from the power line 106 through the driving TFT 112; and the like. It should be noted that the above-mentioned driving TFT 112 and the like are generally called driving elements.

The organic EL device is an active matrix type display device, and each sub-pixel is individually controlled. Specifically, when the scanning line 103 is driven and the switching TFT 108 is turned on, electric potential of the signal line 104 at that time is held in the holding capacitance 110, and a level of the driving TFT (hereinafter simply referred to as a "TFT") 112 is determined in accordance with the state of the holding capacitance 110. Then, the driving current flows from the power line 106 to the organic EL element 29 through the TFT 112. The organic EL element 29, that is, the sub-pixel having the corresponding organic EL element emits light in response to the magnitude of the driving current, thereby emitting the light from each sub-pixel area corresponding to each sub-pixel (33, 34).

Figure 6:
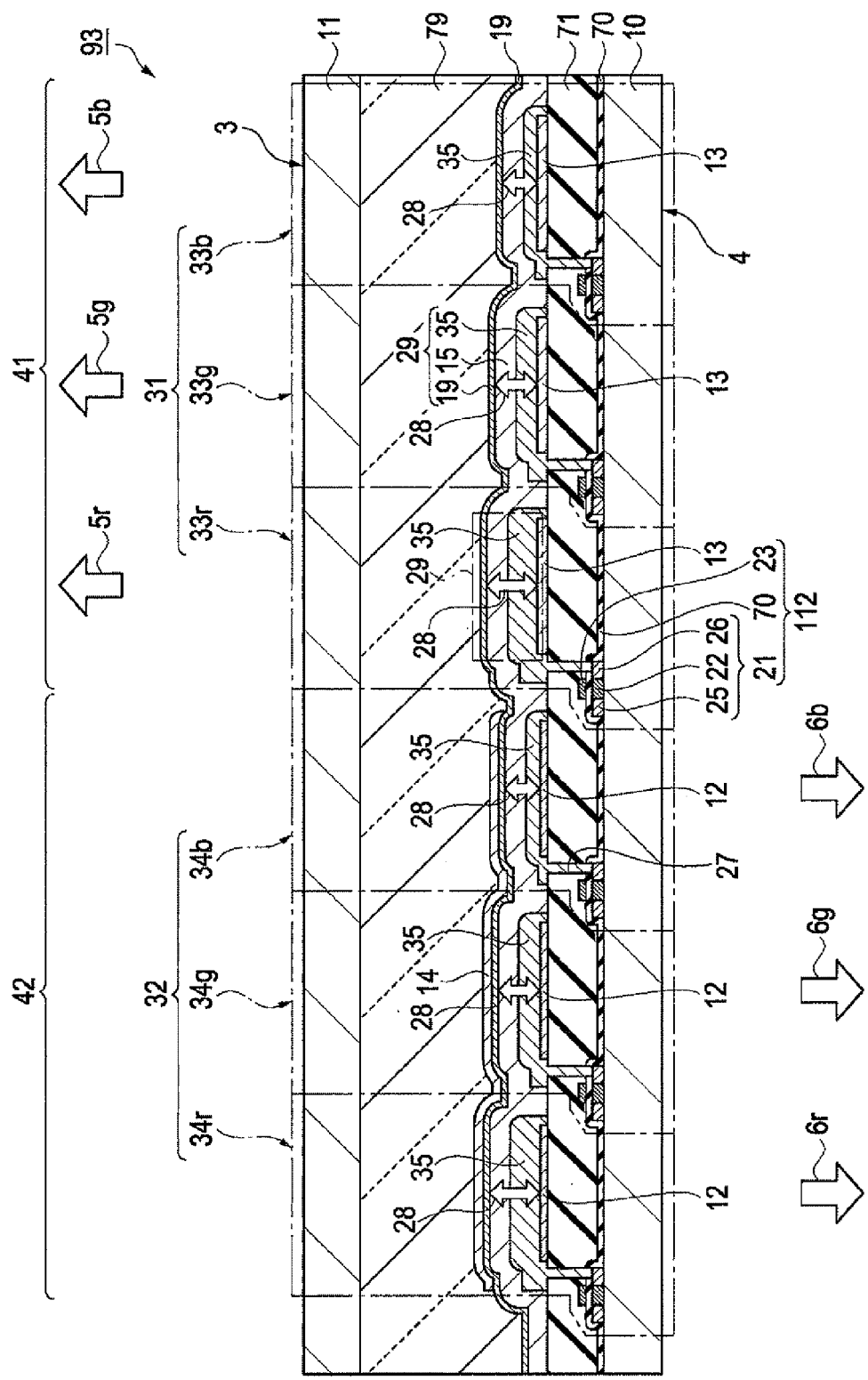
FIG. 6 is a schematic sectional view illustrating a display area of the organic EL device according to the third embodiment.

FIG. 6 is a schematic sectional view of the display area 100 (refer to FIGS. 3A and 3B) of the organic EL device 93 according to the third embodiment. As shown in the drawing, the organic EL device 93 includes: an element substrate 10 as a first substrate; a counter substrate 11 as a second substrate; and respective components formed between the pair of substrates. The surface on the counter substrate 11 side, that is, the surface of the counter substrate 11 on a side opposite to a side, on which the components to be described later are formed, is the upper surface 3. The surface on the element substrate 10 side, that is, the surface of the element substrate 10 on a side opposite to a side, on which the components to be described later are formed, is the lower surface 4.

As described above, the display area 100 is provided with, in plan view, the first pixel areas 41, in which the first display light 5 is emitted from the upper surface 3 and the second pixel areas 42 in which the second display light 6 is emitted from the lower surface 4. The first pixel 31, which includes the three types of sub-pixels of the first red sub-pixel 33r, the first green sub-pixel 33g, and the first blue sub-pixel 33b, is formed in each first pixel area 41. Likewise, the second pixel 32, which includes the three types of sub-pixels of the second red sub-pixel 34r, the second green sub-pixel 34g, and the second blue sub-pixel 34b, is formed in each second pixel area 42. As shown in the drawing, a difference between the first sub-pixels (33r, 33g, 33b) and the second sub-pixels (34r, 34g, 34b) is based on formation positions of the reflection layers (13, 14) in a direction perpendicular to the substrate surface. By using such a difference in the formation position, it is possible to change the direction in which the display light (5, 6) is emitted.

Hereinafter, the respective components constituting each sub-pixel (33, 34) will be described in order from the side close to the element substrate 10. The organic EL device 93 according to the embodiment and the organic EL devices according to the embodiments to be described later are characterized in that the direction of emitting the display light is different between the first sub-pixels (33r, 33g, 33b) and the second sub-pixels (34r, 34g, 34b). Accordingly, in the drawing, the organic EL elements 29 and the TFTs 112, which drive the corresponding organic EL elements, among the components constituting the sub-pixels (33, 34) are shown, but the switching TFTs 108 and the holding capacitances 110 are omitted. It should be noted that, when the "sub-pixel (33, 34)" is noted, it represents the generic term of the above-mentioned six-type sub-pixels.

TFTs 112 are formed as an upper layer of the element substrate 10. A protective layer may be separately formed on the interfaces between the element substrate 10 and the TFTs 112. It should be noted that "upper side" and "upper layer" mean the side close to the counter substrate 11. Each TFT 112 is formed of a semiconductor layer 21, a gate electrode 23 which is formed by patterning the layer the same as the layer of the scanning line 103, a gate insulation layer 70 which is formed between the semiconductor layer 21 and the gate electrode 23, and the like. The area, in which the semiconductor layer 21 substantially overlaps with the gate electrode 23 in plan view, is a channel area 22, and a source area 25 and a drain area 26 are formed on both sides of the corresponding channel area. In addition, the gate electrode 23 has a structure in which Ti (titanium), AlCu (aluminum-copper alloy), and TiN (titanium nitride) are laminated in order from the side close to the element substrate 10.

An interlayer insulation layer 71 is formed as an upper layer of the TFT 112, in which an inorganic insulation material such as silicon nitride or silicon oxide and an organic-based material such as acrylic resin are laminated. The drain area 26 is electrically connected with the pixel electrode 35 through a contact hole 27 which is formed by locally etching the interlayer insulation layer 71. As shown in the drawing, the thickness of the layer of the pixel electrode 35 is different in accordance with the color of the light emitted by each sub-pixel (33, 34). The reason is that the resonant length 28 is changed as described later.

Transparency and conductivity are necessary for the material for forming the pixel electrode 35, and a higher work function than a cathode 19 as a common electrode to be described later is also necessary therefor. For this reason, in the organic EL device 93, the pixel electrode 35 is made of ITO (indium tin oxide) as a transparent conductive material. Instead of ITO, IZO (indium zinc oxide) may be used. Further, PEDOT as a transparent conductive material which does not include metal may be used as well.

A light emitting function layer 15 is formed as an upper layer of the entire element substrate 10 on which the pixel electrode 35 is formed. The light emitting function layer 15 is the generic term. Specifically, the light emitting function layer 15 is formed by laminating a total of four layers of a hole-injecting layer, a hole-transport layer, the organic EL layer, and an electron-transport layer in order from the element substrate 10 side. The laminated layers may be a total of five layers further including an electron-injection layer formed as an upper layer of the electron-transport layer. The light emitting function layer 15 of the organic EL device 93 according to the embodiment is a white-light emitting function layer that emits white light. Accordingly, the above-mentioned organic EL layer is also a layer that emits white light, and is common in all sub-pixels (33, 34). In addition, the above-mentioned organic EL layer is not limited to a layer made of a single material. It is preferable to emit white light as a whole by laminating layers respectively emitting light with different colors.

The cathode 19 is formed as an upper layer of the entire light emitting function layer 15. The laminated body of the cathode 19, the light emitting function layer 15, and the pixel electrode 35 is the organic EL element 29. When a voltage is applied to the pixel electrode 35 through the TFT 112, current flows between the corresponding pixel electrode and the cathode 19 through the light emitting function layer 15. In addition, the organic EL layer included in the light emitting function layer 15 emits light in accordance with the amount of the corresponding current.

A sealing layer 79 is formed as an upper layer of the cathode 19, that is, between the cathode 19 and the counter substrate 11, with the later-described second reflection layer 14 interposed in each second pixel area 42. The sealing layer 79 is shown in the drawing as if it is a single layer. As it is, the sealing layer 79 includes at least: a laminated body formed of a total of three layers of a cathode protective layer, an organic buffer layer, and a gas barrier layer which are formed in order from the upper layer of the cathode 19; and an adhesive layer which is transparent and fills between the corresponding laminated body and the counter substrate 11. All the respective layers constituting the above-mentioned sealing layer 79 are made of transparent materials, and thus there is no obstacle to transmission of the light emitted from the side of the upper surface 3.

The cathode 19 of the organic EL device 93 functions as an electrode, and simultaneously functions as a semi-transreflective layer as well. Accordingly, it is necessary for the cathode 19 to have conductivity and semi-transparency/reflectivity of transmitting approximately 50% of the emitted light and reflecting the remaining approximately 50% thereof. Accordingly, the cathode 19 is made of Al or Mg.Ag alloy with a layer thickness of approximately 10 nm.

Further, each semi-transreflective layer 12 is formed below each pixel electrode 35 in each second sub-pixel (34r, 34g, 34b) with a protective layer, which is not shown, interposed therebetween. The semi-transreflective layer 12 is a film layer having semi-transparency/reflectivity similarly to the cathode 19, and is thus made of Al or Mg.Ag alloy with a layer thickness of approximately 10 nm similarly to the cathode 19. However, unlike the cathode 19, it is necessary for the semi-transreflective layers 12 to be electrically independent of each other between the second sub-pixels (34r, 34g, 34b) adjacent to each other. Accordingly, the corresponding semi-transreflective layer is patterned in an island shape.

Each first reflection layer 13 is formed below each pixel electrode 35 in each first sub-pixel (33r, 33g, 33b) with a protective layer, which is not shown, interposed therebetween. It is preferable that the first reflection layer 13 (and the second reflection layer 14 to be described later) should be made of a material which is high in reflectance and is excellent in processability (patterning ability). Accordingly, each reflection layer (13, 14) is made of Al (aluminum) or the like. The first reflection layer 13 has a thickness of approximately 80 nm, and is formed by patterning an Al layer which is formed on the entire surface. Unlike the second reflection layer 14 to be described later, it is necessary for the first reflection layers 13 to be electrically independent of each other between the corresponding first reflection layers adjacent to each other. Accordingly, each first reflection layer 13 is patterned in an island shape such as a rectangular shape. It should be noted that the first reflection layer 13 may be formed not by the patterning but by a mask film formation method such as mask deposition.

The second reflection layer 14 is formed as an upper layer of the cathode 19 in each second sub-pixel (34r, 34g, 34b). As described above, the corresponding second reflection layer is made of Al similarly to the first reflection layer 13, and has a layer thickness of approximately 80 nm as well. In addition, it is preferable that the corresponding second reflection layer should be electrically connected to the cathode 19. Hence, the corresponding second reflection layer is directly laminated as an upper layer of the cathode 19 without the protective layer. Accordingly, in order to prevent the underlaid cathode 19 from being damaged, it is not preferable to perform the patterning based on the photolithography, but preferable to perform the mask film formation method such as the mask deposition.

Further, the second reflection layer 14 is different from the first reflection layer 13 in that it is not necessary to have electrically mutual independence between the second sub-pixels (34r, 34g, 34b) adjacent to each other. Accordingly, the second reflection layer 14 may be formed throughout each second pixel area 42. As shown in FIG. 3A, when the second pixel areas 42 are arranged in columns, each second reflection layer 14 is formed in a column shape (a stripe shape).

By using the first reflection layer 13 and the second reflection layer 14, the organic EL device 93 is able to emit the first display light 5 from the upper surface 3 in each first pixel area 41 and emit the second display light 6 from the lower surface 4 in each second pixel area 42.

First, in the first pixel area 41, the first reflection layer 13 is positioned between the light emitting function layer 15 and the element substrate 10, light emitting toward the element substrate 10 side is reflected toward the counter substrate 11 side, and is emitted as the first display light 5 from the upper surface 3 side. Further, the light emitting toward the counter substrate 11 side is directly emitted as the first display light 5 from the counter substrate 11 side. Accordingly, finally, most of the light generated by each first pixel 31 is emitted as the first display light 5 from the counter substrate 11 side, that is, emitted as the first display light 5 from the upper surface 3 side.

Furthermore, since the cathode 19 has semi-transparency/reflectivity as described above, a part of the light is repeatedly reflected between the cathode 19 and the first reflection layer 13, and is then emitted from the upper surface 3 side. However, such a phenomenon will be described later together with the corresponding phenomenon in the second pixel area 42.

Next, in the second pixel area 42, the light, which is generated in the light emitting function layer 15 and travels toward the element substrate 10 side, is transmitted through the semi-transreflective layer 12, and is emitted as the second display light 6 from the lower surface 4 side. Further, since the second reflection layer 14 is positioned at the upper layer of the light emitting function layer 15, the light being emitted toward the counter substrate 11 side is reflected by the corresponding second reflection layer, and is emitted as the second display light 6 from the lower surface 4 toward the element substrate 10 side. Accordingly, finally, most of the light generated by the second pixel area 42 is emitted as the second display light 6 from the lower surface 4.

Consequently, as described above, by using the light generated in the single light emitting function layer, the organic EL device 93 is able to form an image of the first display light 5 on the upper surface 3 side in the first pixel areas 41 and form an image of the second display light 6 on the lower surface 4 side in the second pixel areas 42. Each lower-case alphabet letter added to the display light (5, 6) indicates each color of the corresponding display light.

As described above, the organic EL device 93 is a color display device. In the organic EL device 93, the white light generated in the light emitting function layer 15 is turned into colored light by enhancing light in a specific wavelength range through resonance, and then the colored light is emitted, thereby realizing color display. Hereinafter, such resonance will be described.

First, in each first pixel area 41, approximately half of the light emitted from the light emitting function layer 15 travels toward the element substrate 10 side, is reflected by the first reflection layer 13, and travels toward the counter substrate 11 side. Further, the remaining approximately half of the light directly travels toward the counter substrate 11 side. Then, approximately 50% of the light traveling toward the counter substrate 11 side is reflected by the cathode 19 having the semi-transparency/reflectivity, and travels toward the element substrate 10 side again. The remaining approximately 50% of the light is transmitted through the cathode 19, is further transmitted through the sealing layer 79 and the counter substrate 11, and is emitted from the upper surface 3.

The light, which is reflected by the cathode 19 and travels toward the element substrate 10 side, is reflected by the first reflection layer 13, and travels toward the counter substrate 11 side again. The remaining approximately 50% of the light is reflected by the semi-transreflective layer 12, and travels toward the counter substrate 11 side. As described above, resonance is defined as a phenomenon in which the light emitted by the light emitting function layer 15 is repeatedly reflected between the semi-transreflective layer (which corresponds to the cathode 19 in the first pixel area 41) and the reflection layer (that is, the first reflection layer 13). Such resonance enhances the light in the specific wavelength range depending on a distance between the semi-transreflective layer and the reflection layer. Here, the above-mentioned distance is a resonant length 28. In addition, a resonator structure is defined as a structure in which the light emitting function layer 15 is sandwiched between the reflection layer (13, 14) and the semi-transreflective layer 12 (or the cathode 19 having semi-transparency/reflectivity). In the organic EL device 93, the white light is turned into colored light by enhancing the light in the specific wavelength range depending on the above-mentioned resonant length through such resonance, and then the colored light is emitted.

In each sub-pixel (33, 34), by changing the layer thickness of the pixel electrode 35, the resonant length 28 is set in accordance with the emitted light. Specifically, in each sub-pixel (33*r*, 34*r*) for emitting red light, the resonant length 28 is set to a distance for enhancing light in a wavelength range corresponding to the red light. In each sub-pixel (33*g*, 34*g*) for emitting green light, the resonant length 28 is set to a distance for enhancing light in a wavelength range corresponding to the green light. In each sub-pixel (33*b*, 34*b*) for emitting blue light, the resonant length 28 is set to a distance for enhancing light in a wavelength range corresponding to the blue light. With such a configuration, the organic EL device 93 is able to form color images on both sides of the upper surface 3 and the lower surface 4 by using the light emitting function layer 15 which is formed as a single layer (that is, only one layer) and is made of a common material throughout the display area 100.

Advantages of the Embodiment

As described above, the organic EL device 93 according to the embodiment is characterized in that the reflection layers (13, 14) are formed as two layers. In each area in which light is emitted toward the upper surface 3 side, the first reflection layer 13 is formed on the side of the light emitting function layer 15 close to the lower surface 4. In each area in which light is emitted toward the lower surface 4 side, the second reflection layer 14 is formed on the side of the light emitting function layer 15 close to the upper surface 3. Hence, although the light emitting function layer 15 is formed as a single layer, it is possible to display images on both the above-mentioned surfaces thereof. Even in the organic EL device for displaying an image on either surface, in order to efficiently use the light generated in the light emitting function layer 15, the reflection layer is generally provided. Accordingly, in the organic EL device 93 according to the embodiment, simply by further adding a process of forming the reflection layer in a general organic EL device, it is possible to display images on both sides thereof.

Further, in the shape of the organic EL device, the thickness of the organic EL device increases only by a thickness of the single reflection layer, and thus it is possible to embody a lightweight and compact double-sided display device. Accordingly, by using the organic EL device 93 according to the embodiment in the double-sided display device as a component of the above-mentioned head-mounted display (61, 62), it is possible to embody a lightweight and compact head-mounted display (61, 62) capable of sufficiently securing the field of view at the time of seeing the view of the outside at a low cost.

Further, the organic EL device 93 according to the embodiment is able to display color images on both surfaces (3, 4) by using the resonance, regardless of whether the common light emitting function layer 15 is formed throughout the display area 100. Even in the organic EL device that displays an image on either surface, resonance is generally used in order to improve the chromatic purity by employing the common light emitting function layer 15 formed throughout the display area 100. In this case, the cathode 19 employs the semi-transreflective layer. Accordingly, in the organic EL device 93 according to the embodiment, only by adding a process of forming the semi-transreflective layer 12 on the areas in which the light is emitted toward the lower surface 4 side, it is possible to display color images on the both surfaces while using the common light emitting function layer 15.

Consequently, by using the organic EL device 93 according to the embodiment in the double-sided display device as a component of the above-mentioned head-mounted display (61, 62), it is possible to embody the lightweight and compact head-mounted display (61, 62) for displaying the color images at a low cost.

Fourth Embodiment

Next, the fourth embodiment of the invention will be described. The organic EL device 94 according to the fourth embodiment is an organic EL device of a double-sided display type which has a configuration similar to the above-mentioned organic EL device 93 and is capable of color display. The organic EL device 94 is different from the organic EL device 93 in that there are provided color filters. Therefore, in the following description, if there are elements common to the organic EL device 93, the elements are referenced by the same reference numerals and signs, and description thereof will be partially omitted.

Figure 7:
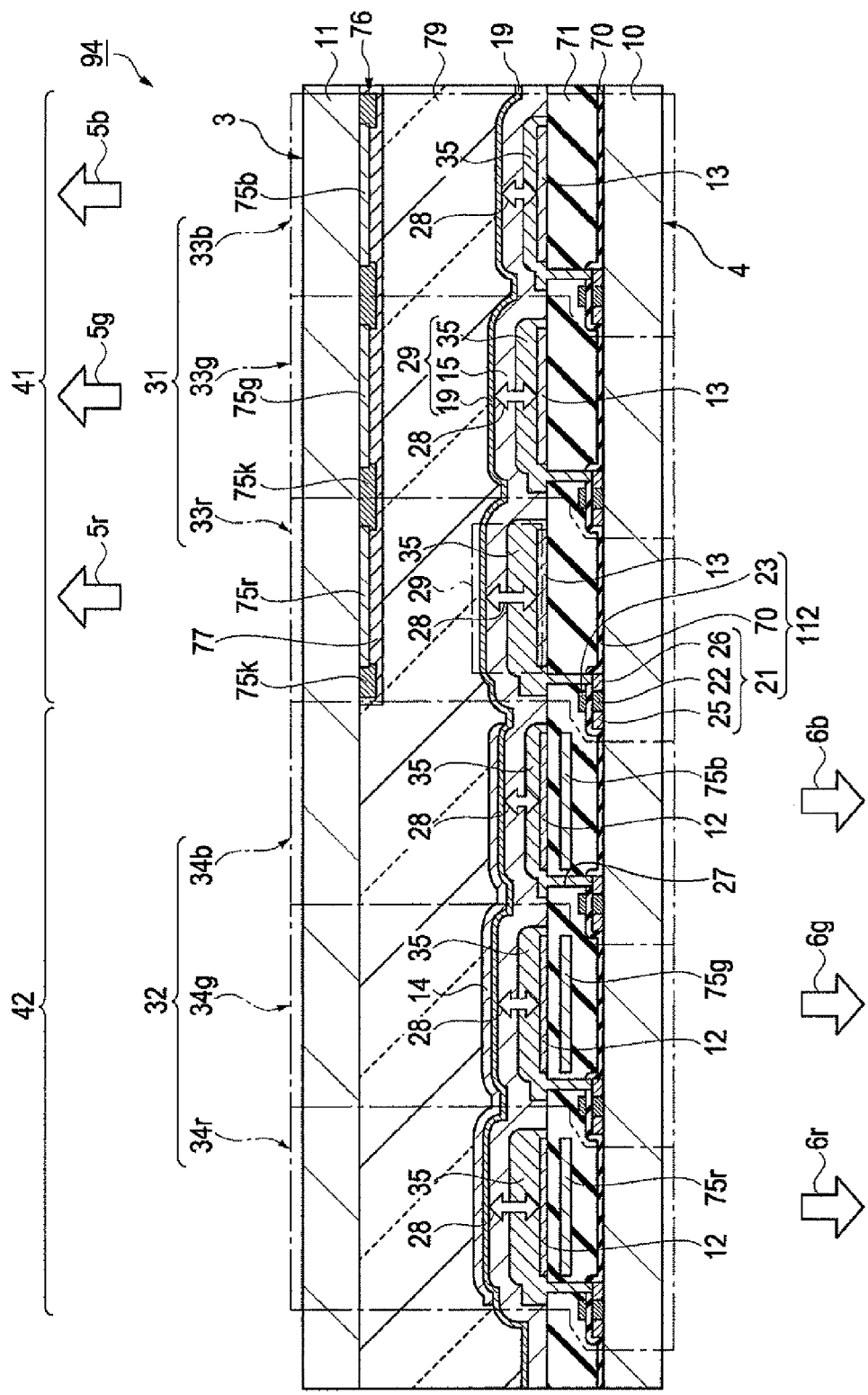
FIG. 7 is a schematic sectional view illustrating a display area of the organic EL device according to a fourth embodiment.

FIG. 7 is a schematic sectional view of the display area 100 (refer to FIGS. 3A and 3B) of the organic EL device 94 according to the fourth embodiment. As shown in the drawing, in the organic EL device 94, each of the first pixel 31 and the second pixel 32 has color filters 75 (r, g, b), which correspond to the colors of light emitted by the sub-pixels (33, 34), provided on each light emission side.

Specifically, in each first pixel area 41, a color filter layer 76, which includes color filters 75 (r, g, b), a black matrix 75*k*, and a overcoat layer 77, is formed on a side of the counter substrate 11 facing toward the element substrate 10. In addition, in each second pixel area 42, the color filters 75 (r, g, b)

are formed in the interlayer insulation layer 71, that is, between the pixel electrode 35 and the element substrate 10.

Each color filter 75 (r, g, b) is a color transparent resin layer, and has a function of improving the chromatic purity by enhancing light in a specific wavelength range in a method of transmitting the light in the corresponding specific wavelength range at a ratio higher than a transmission ratio of light in another wavelength range. Specifically, the red color filter 75r has a function of transmitting the light in the wavelength range corresponding to the red light at a high ratio. The green color filter 75g has a function of transmitting the light in the wavelength range corresponding to the green light at a high ratio. The blue color filter 75b has a function of transmitting the light in the wavelength range corresponding to the blue light at a high ratio.

As described above, the organic EL device 94 has a configuration in which the color filters 75 (r, g, b) are added to the organic EL device 93. With such a configuration, in the light emitted through the semi-transreflective layer 12 or the cathode 19, the light in the specific wavelength range is enhanced by the resonator structure, and is turned into colored light which has any color of the three primary colors. In addition, in the organic EL device 94, the display quality thereof is improved by further improving the chromatic purity of the colored light through the corresponding color filter.

Advantages of the Embodiment

As described above, the organic EL device 94 according to the embodiment is characterized in that the color filters 75 (r, g, b) are provided on each light emission side in each pixel area (41, 42). Hence, although the light emitting function layer 15 that emits the white light common in the entire display area 100 is used, it is possible to emit light of which the chromatic purity is greatly improved for each sub-pixel (33, 34). Accordingly, if the manufacturing cost is slightly increased by the addition of the color filters 75 (r, g, b), it is possible to embody an organic EL device capable of double-sided display in which the display quality is further improved. Further, when the organic EL device 94 according to the embodiment is used as the double-sided display device 90 included in the head-mounted display (61, 62), it is possible to reduce a difference between the display quality for the view of the outside and the display quality for the image of the double-sided display device 90. As a result, it is possible to reduce a sense of incongruity and the like when the optical systems are switched.

Fifth Embodiment

Next, the fifth embodiment of the invention will be described. The organic EL device 95 according to the fifth embodiment is characterized in that the organic EL layer 17 included in the light emitting function layer 15 is individually formed for each corresponding sub-pixel in accordance with each color of the light emitted by the sub-pixel (33, 34). In addition, in the other configurations, the organic EL device 95 according to the fifth embodiment is similar to the organic EL device 93 according to the third embodiment. Therefore, in the following description, if there are elements common to the organic EL device 93, the elements are referenced by the same reference numerals and signs, and description thereof will be partially omitted.

Figure 8:
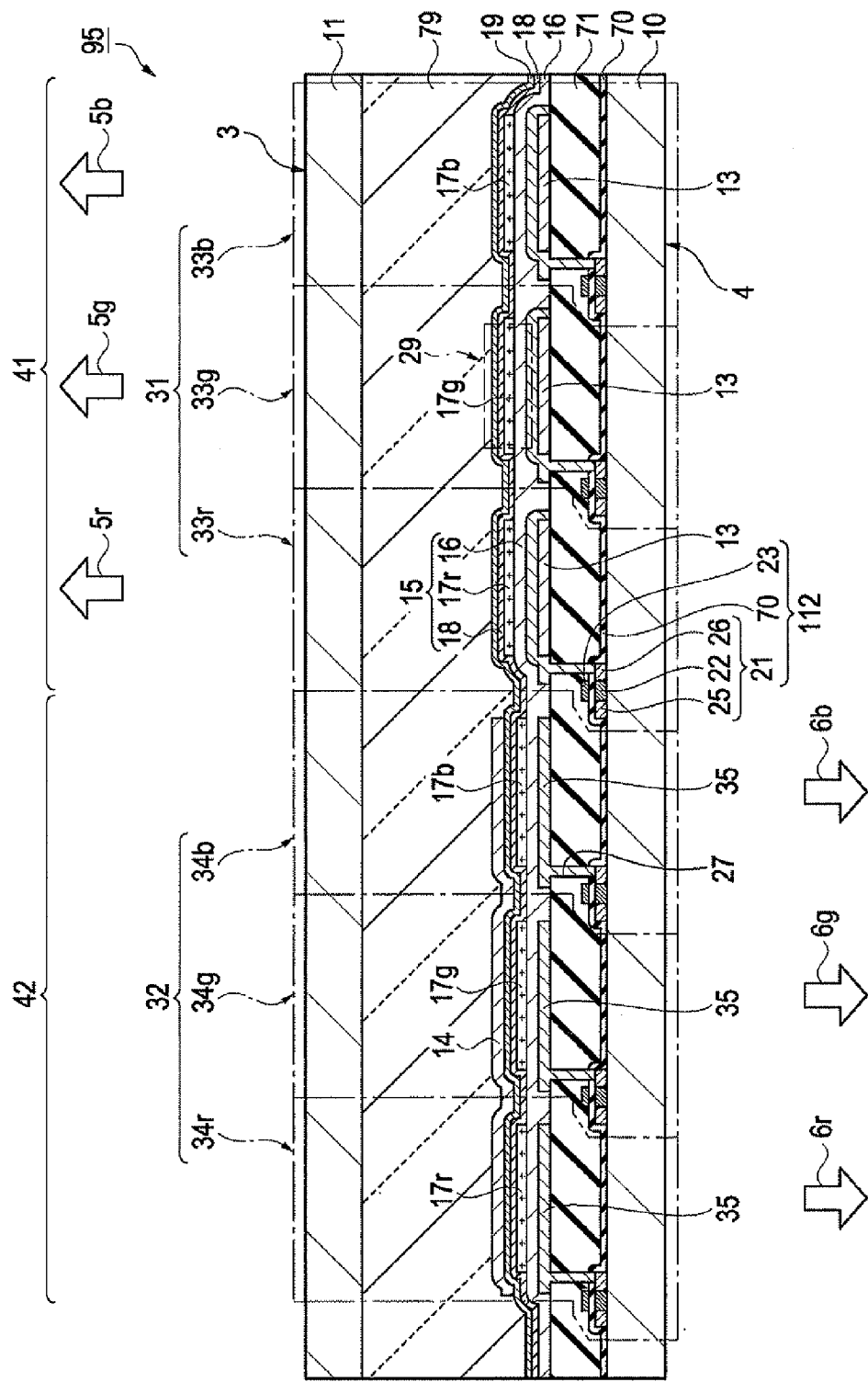
FIG. 8 is a schematic sectional view illustrating a display area of the organic EL device according to a fifth embodiment.

FIG. 8 is a schematic sectional view of the display area 100 (refer to FIGS. 3A and 3B) of the organic EL device 95 according to the fifth embodiment. As described above, the light emitting function layer 15 is the laminated body of the hole-injecting layer, the hole-transport layer, the organic EL layer, the electron-transport layer, and the like. In the organic EL device 95, among the elements of the light emitting function layer 15, the organic EL layer is individually formed for each sub-pixel (33, 34). The layers other than the organic EL layer are common, and are formed throughout the display area 100.

As shown in the drawing, the light emitting function layer 15 includes: a hole-injecting/transport layer 16 which is a laminated body of a hole-injecting layer and a hole-transport layer; an organic EL layer 17; and an electron-transport layer 18 which are sequentially formed as the upper layers of the pixel electrode 35. In the elements of the total of three layers, the hole-injecting/transport layer 16 and the electron-transport layer 18 are common for each sub-pixel (33, 34), and are formed throughout the display area 100.

In addition, each organic EL layer 17 is formed in an island shape in accordance with each color of light emitted by each sub-pixel (33, 34). For example, a red organic EL layer 17r for emitting red light is formed in an island shape in each red sub-pixel (33r, 34r), a green organic EL layer 17g for emitting green light is formed in an island shape in each green sub-pixel (33g, 34g), and a blue organic EL layer 17b for emitting blue light is formed in an island shape in each blue sub-pixel (33b, 34b). By using each organic EL layer 17 (r, g, b) individually formed, each sub-pixel (33, 34) of the organic EL device 95 is able to emit light, which is high in chromatic purity, for each corresponding sub-pixel without using the resonator structure.

The cathode 19 is formed as an upper layer of the light emitting function layer 15. The cathode 19 is formed by laminating ITO as an upper layer of the laminated body including Al with a layer thickness of 2 nm as the electron-injection layer and LiF (lithium fluoride) with a layer thickness of 1 nm. As described above, it is not necessary for the organic EL device 95 to use the resonator structure. Thus, it is not necessary for the cathode 19 to have semi-transparency/reflectivity. That is, it may be allowed to transmit light by an amount higher than 50%. For this reason, focusing on satisfying transparent conductivity and electron injection ability, a configuration in which the above-mentioned ITO layer is a principal part is adopted.

Further, since it is not necessary for the organic EL device 95 to have the resonator structure, contrary to the above-mentioned organic EL devices 93 and 94, the semi-transreflective layer 12 (refer to FIG. 6) is not formed in the second pixel area 42. Therefore, the layer thickness of the pixel electrode 35 is the same in all sub-pixels (33, 34). Accordingly, the difference between the two pixels (31, 32) is only the formation positions of the reflection layers (13, 14).

Advantages of the Embodiment

As described above, the organic EL device 95 according to the embodiment is characterized in that the organic EL layer 17 is individually formed in accordance with each emission color of each sub-pixel (33, 34). Since each organic EL layer 17 emits not the white light but the colored light, the resonator structure is not necessary. Accordingly, only by adding a process of forming the second reflection layer 14 in the second pixel area 42, it is possible to embody a double-sided display device capable of displaying color images on both sides of the upper surface 3 and the lower surface 4.

Further, the organic EL device 95 according to the embodiment may be used as the double-sided display device included in the head-mounted display (61, 62). In this case, it is possible to colorize the images of the double-sided display device in accordance with the view of the outside. Hence, it is possible to embody a head-mounted display, for which the sense of incongruity at the time of switching the optical systems is reduced, at a low cost.

The embodiment of the invention is not limited to the above-mentioned embodiments, and various modifications and variations may be added. Modified examples will be described below.

Modified Example 1

All the organic EL devices according to the above-mentioned third to fifth embodiments are double-sided display devices which display color images. However, as the double-sided display device 90 included in the head-mounted display (61, 62), a monochrome display device may be used. When the contents of the display on the corresponding display device are only textual information, the monochrome display device is sufficient. Thus, it is possible to embody a head-mounted display capable of switching the displays at a low cost.

Modified Example 2

Each organic EL device according to the above-mentioned third to fifth embodiments has either of the following two configurations. The first one is the configuration in which the white light is turned into the colored light by the resonator structure and/or the color filter. The second one is the configuration in which the organic EL layer for emitting colored light is employed. However, the embodiment of the invention is not limited to the above-mentioned configurations. For example, it may be possible to adopt a configuration in which the resonator structure and/or the color filter are added to the organic EL layer that emits colored light. With such a configuration, it is possible to further improve the display quality of the double-sided display device (the organic EL device) 90. As a result, it is possible to reduce a sense of incongruity when the optical systems are switched.

Modified Example 3

In the above-mentioned second embodiment, the half mirror 85 included in the head-mounted display 62 has a transmittance of approximately 50%, that is, has the function of transmitting approximately 50% of light. However, the transmittance of the half mirror included in the head-mounted display according to the embodiment of the invention is not limited to such a value. When priority is placed on the view of the outside, it may be possible to use the half mirror 85 of which the transmittance is set to be higher and the reflectance is set to be lower.

Modified Example 4

In the description of each above-mentioned embodiment, the organic EL devices 93 to 95 are active matrix types. However, they may be passive (simple) matrix types in which the light emitting function layer is sandwiched between the scanning electrode and the data electrode. Even in such a configuration, by forming the reflection layers (13, 14) on both sides of the light emitting function layer 15, it is possible to perform the double-sided display using the single light emitting function layer.

Modified Example 5

In each head-mounted display (61, 62) according to the above-mentioned embodiments, the movement of the mirrors (the half mirror 85 and the total reflection mirror 86) is a rotation about the shaft 87 as a center, but may be a parallel slide.

Modified Example 6

In each above-mentioned embodiment, the total reflection mirrors 86 and the half mirrors 85 included in the pair of optical systems (63, 64) are moved to have the same angle in the first optical system 63 and the second optical system 64. For example, in the first embodiment, both the total reflection mirrors 86 included in the pair of optical systems (63, 64) have an angle of approximately 45 degrees with respect to the double-sided display device 90 in the situation shown in FIG. 1A, and are disposed to be in parallel with the double-sided display device 90 in the situation shown in FIG. 1B.

However, the angles formed between the double-sided display device 90 and the total reflection mirrors 86 and/or half mirrors 85 may be different in the first optical system 63 and the second optical system 64. For example, in the case shown in FIG. 1, the total reflection mirror 86 included in the first optical system 63 may be in parallel with the double-sided display device 90, and the total reflection mirror 86 included in the second optical system 64 may have an angle of approximately 45 degrees with respect to the double-sided display device 90. In such a situation, the right eye 81 is in visual contact with the external light 7, and the left eye 82 is in visual contact with the image displayed on the double-sided display device 90. In other words, it is possible to see the above-mentioned images and the view of the outside simultaneously without using the half mirror 85.

The entire disclosure of Japanese Patent Application No. 2009-268445, filed Nov. 26, 2009 is expressly incorporated by reference herein.

What is claimed is:

1. A head-mounted display comprising:
a double-sided display device displaying an image on a first side and a second side opposed the first side;
a first optical system that forms the image displayed on the first side of the double-sided display device on one eye of a wearer; and
a second optical system that forms the image displayed on the second side of the double-sided display device on the other eye of the wearer,
wherein the first optical system and the second optical system have switching mechanisms which make at least a part of a view being different from the image displayed on the double-sided display device, visible in the eyes of the wearer.

2. The head-mounted display according to claim 1,
wherein the first optical system includes a first mirror reflecting at least a part of the image displayed on the first side of the double-sided display device and a first convex lenses disposed between the double-sided display device and the first mirror, and the second optical system includes a second mirror reflecting at least a part of the image displayed on the second side of the double-sided display device and second convex lenses disposed between the double-sided display device and the second mirror, and
wherein the first mirror and the second mirror each have the switching mechanisms.

3. The head-mounted display according to claim 2,
wherein the first mirror includes a first half mirror having semi-transparency/reflectivity and a first total reflection mirror having total reflectivity, the first half mirror and the first total reflection mirror being able to move independently of each other, and the second mirror includes a second half mirror having semi-transparency/reflectivity and a second total reflection mirror having total reflectivity, the second half mirror and the second total reflection mirror being able to move independently of each other.

4. The head-mounted display according to claim 3,
wherein the double-sided display device is a double-sided display device formed by combining two display devices so that surfaces on which the images are not displayed face each other.

5. The head-mounted display according to claim 3,
wherein the double-sided display device has a pair of substrates of a first substrate including the first surface and a second substrate including the second surface and a light emitting function layer including at least an organic EL layer which is disposed between the first substrate and the second substrate, in which second pixels for emitting light toward the first substrate and first pixels for emitting light toward the second substrate are arranged,
wherein each first pixel has a pixel electrode which is formed on a side of the light emitting function layer close to the first substrate, a common electrode that is formed on a side of the light emitting function layer close to the second substrate, and a reflection layer which is formed on the side of the light emitting function layer close to the first substrate,
wherein each second pixel has a pixel electrode which is formed on the side of the light emitting function layer close to the first substrate, a common electrode that is formed on the side of the light emitting function layer close to the second substrate, and a reflection layer which is formed on the side of the light emitting function layer close to the second substrate, and
wherein in the double-sided display device, driving elements for driving each pixel electrode are formed on the side of the light emitting function layer close to the first substrate.

6. The head-mounted display according to claim 5,
wherein in the double-sided display device, each first pixel has three types of sub-pixels of a first red sub-pixel for emitting red light, a first green sub-pixel for emitting green light, and a first blue sub-pixel for emitting blue light, and each second pixel has three types of sub-pixels of a second red sub-pixel for emitting red light, a second green sub-pixel for emitting green light, and a second blue sub-pixel for emitting blue light.

7. The head-mounted display according to claim 6,
wherein each sub-pixel has a color filter corresponding to an emission color of the corresponding sub-pixel on a side of the light emitting function layer opposite to the reflection layer.

8. The head-mounted display according to claim 6,
wherein each sub-pixel has a semi-transreflective layer on the side of the light emitting function layer opposite to the reflection layer, and
wherein an optical resonator structure for resonating light in a specific wavelength range is formed between the semi-transreflective layer and the reflection layer.

9. The head-mounted display according to claim 6,
wherein the organic EL layer included in the light emitting function layer is individually formed in accordance with the emission color of the corresponding sub-pixel for each sub-pixel.

* * * * *